United States Patent [19]
Sanchez et al.

[11] Patent Number: 5,756,026
[45] Date of Patent: May 26, 1998

[54] METHOD FOR CONTROL OF POST MOLDING FABRIC CURL AND DISTORTION

[75] Inventors: William L. Sanchez, Conyers, Ga.; Walter J. Freeman, Landenberg, Pa.

[73] Assignee: Fiberco, Inc., Wilmington, Del.

[21] Appl. No.: 583,513

[22] Filed: Jan. 5, 1996

[51] Int. Cl.[6] .................. B29C 71/00; B29C 35/00; B29C 33/08
[52] U.S. Cl. .................. 264/138; 264/234; 264/235; 264/243; 264/322; 264/324; 264/327; 264/345; 264/346; 264/348
[58] Field of Search .................. 264/243, 235, 264/346, 234, 345, 348, 327, 322, 324, 138

[56] References Cited

U.S. PATENT DOCUMENTS

| | | | |
|---|---|---|---|
| H559 | 12/1988 | Brown | 264/327 |
| 2,305,433 | 12/1942 | Kyle | 264/348 |
| 2,891,279 | 6/1959 | Neumann | 264/327 |
| 3,049,762 | 8/1962 | Jackson | 18/59 |
| 3,150,024 | 9/1964 | Penman | 156/229 |
| 3,209,467 | 10/1965 | Taylor, Jr. | 264/346 |
| 3,555,135 | 1/1971 | Paul | 264/235 |
| 3,673,034 | 6/1972 | Squier | |
| 4,157,415 | 6/1979 | Lindenberg | |
| 4,174,991 | 11/1979 | Reuben et al. | |
| 4,189,336 | 2/1980 | Hutflesz | 264/243 |
| 4,357,381 | 11/1982 | Wilson | 264/327 |
| 4,581,272 | 4/1986 | Walters et al. | |
| 4,590,027 | 5/1986 | Murphy et al. | |
| 4,617,208 | 10/1986 | Cadenhead, Sr. | 264/345 |
| 4,750,374 | 6/1988 | Goss | |
| 5,164,142 | 11/1992 | Simmonds | 264/348 |

*Primary Examiner*—Jan H. Silbaugh
*Assistant Examiner*—Robin S. Gray
*Attorney, Agent, or Firm*—Greenblum & Bernstein P.L.C.

[57] ABSTRACT

A process for eliminating post-molding fabric curl and distortion in molded fabrics and fabrics produced thereby. The molded fabrics are laminates including a non-woven fabric face and a binder layer and/or sheet backing. Post-molding curling and distortion can be eliminated by maintaining heat on the face fabric until the backing has been cooled enough to be rigid.

28 Claims, 2 Drawing Sheets

METHOD FOR CONTROL OF POST MOLDING FABRIC CURL AND DISTORTION

BACKGROUND OF THE INVENTION

1. Field of the Invention

The invention relates to the elimination of curl and fabric distortion after molding of fibrous fabrics which are backcoated. The invention is particularly applicable to carpet and fabric laminates molded to fit automobile trunks and automotive interior trim sections.

2. Description of Background Information

Compression molding of fabric interior parts is growing in popularity among automobile manufacturers as a replacement for cut and sewn fabric parts because of the substantial cost savings in assembly labor. Assembly labor is substantially reduced because of greater simplicity in installing the molded parts, and because the number of parts to be installed can be reduced by preparing integrated molded parts.

Interior automobile parts in general, and in particular interior trunk lining, interior trim and insulation, needs to be made in a permanent, dimensionally stable shape to meet quite exacting dimensional specifications for assembly. In efforts to meet these requirements, nonwoven, tufted and woven fabrics have been made from thermoplastic fibers such as polypropylene, polyester and nylon. These fabrics have been provided with a moldable backing made of latex, polyethylene and/or another thermoplastic of lower melting point.

Polypropylene fibers, in needlepunched nonwoven fabrics, have found commercial use as interior molded trim for automobiles in package shelves, door trim, sail panels, seat lowers, passenger and load floors and trunks. Typically, the polypropylene fabrics are backcoated with a latex (ethylene vinyl acetate, styrene butyl rubber, acrylic, etc.) and a polyethylene extruded film. Moldable polyurethanes are also known for similar applications.

The backcoated fabrics are preheated with a radiant heat, such as that provided from an infrared source, until the backing material softens. The fabrics are then compression molded in a cold mold comprising male and female sections exhibiting the desired size and shape. The moldable backcoating is allowed to cool and solidify in the mold so that it takes on the configuration and dimension of the mold, and holds the textile fabric to the shape thereof.

Known processes of compression molding typically involve a preheating step; a cold, compression molding step; and a trim step. For example, U.S. Pat. No. 4,581,272, which is hereby incorporated herein by reference in its entirety, discloses the preheating of a composite of polypropylene and polyester to a temperature of 365° F., which temperature is above the melting point of polypropylene in a radiant heat oven. The dwell time is sufficient to cause softening and partial melting of the polypropylene fibers, but not long enough to cause a flow of molten polyester. The composite is next placed directly in a pre-gapped, matched, male/female mold, which is closed until the interior temperature of the fabric drops to below 240° F. It is noted that removal of the heated part before sufficient cooling results in warping and distortion of the molded part.

Similarly, a latex or polyethylene backing may be heated rapidly with infrared heaters under automatic timed cycles, to a temperature that softens the latex and melts the polyethylene (i.e., about 125° C.), which is below the melting point of a polypropylene face fabric (i.e., about 166° C.). The preheat step can take from 20 to 120 seconds, preferably the shortest time cycle needed to soften or melt the latex and/or the polyethylene. The face fiber for the fabric generally stays about 20° C. to 40° C. cooler than the moldable backing during this stage.

After preheating, the fabric is typically compression molded in a cold mold having male and female sections of the desired shape and size. The moldable backing cools and solidifies in the mold and takes on the configuration and dimensions of the mold. Thus, the textile fabric is also held to the shape imparted to the moldable backing.

Typically, the known processes of compression molding backcoated fabric interior parts yield products which exhibit post molding curl and dimensional changes after aging from a few minutes to twenty-four hours. These post molding distortions are induced by a latent shrinkage force in the fibers of the face fabric, brought on by the preheating and cold molding processes. In efforts to compensate for these distortions, producers of molded fabric parts have adjusted mold dimensions and handling procedures for the fabrics. One typical attempt at compensation has been to laminate the fabric to a more rigid structure such as a moldable board, to prevent distortion.

SUMMARY OF THE INVENTION

The present invention provides modifications to the compression molding process to achieve molded fabrics which are free or substantially free of curling and other fabric distortions. Other objects and advantages of the present invention and advantageous features thereof will become apparent as the description proceeds herein.

Included in the description is a process for molding textile fabrics and substantially preventing post molding fabric curl and distortion. The process includes: compression molding a fabric comprising a face fabric and backing layer in a compression mold with at least the backing layer at an elevated temperature greater than a melting temperature of the backing layer; cooling the backing layer while the face fabric and backing layer are still in the compression mold, at least until the backing layer solidifies; and heating the face fabric, during the cooling the backing layer step, to relax the stresses introduced by molding.

The compression molding process preferably includes: preheating the backing layer to a temperature that is greater than or equal to a melting temperature of the backing layer, but less than a melting temperature of the face fabric; positioning the fabric over a female portion of the compression mold; and mating a male portion of the compression mold with the female portion, thereby compressing the fabric therebetween. The fabric is then removed from the compression mold upon substantial solidification of the backing layer.

Immediately upon removal, the fabric is placed in a tray having a shape and dimensions which are substantially the same as the compression mold. The tray is used for trimming the fabric to predetermined specifications.

The mold surface of the compression mold which contacts the backing layer during molding is a cold mold at room temperature or less. The mold surface which contacts the face fabric during molding is heated so as to heat the face fabric to a preferred temperature between about 60° C. and 130° C., more preferably between about 80° C. and 120° C., and most preferably between about 90° C. and 100° C. This temperature is maintained at least until the backing layer substantially solidifies. The heating stage is generally conducted over the preferred range of about 20 to 180 seconds, more preferably about 60 to 120 seconds, and most preferably about 60 to 90 seconds.

The cooling of the backing layer is allowed to proceed while the face fabric and backing layer are still in the compression mold, at least until the backing layer solidifies. The cooling process generally proceeds until the backing layer reaches a temperature in the range about 35° C. to about 50° C.

The face fabric is selected from the group consisting of non-woven fabrics, tufted fabrics, knitted fabrics and woven fabrics, preferably needlepunched non-woven fabrics. The backing layer is selected from the group consisting of moldable latexes, moldable polyurethanes, polyethylene, polypropylene copolymers, thermoplastics having a lower melting point than polypropylene, a latex binder backed with polyethylene, a latex binder backed with at least one moldable polyurethane, a latex binder backed with at least one polypropylene copolymer, and a latex binder backed with at least one thermoplastic having a lower melting point than polypropylene.

The face fabric comprises polyolefins. Preferably, the polyolefins are selected from the group consisting of isotactic polypropylenes, mixtures of propylenes with polyethylenes, and resins having a preferred melting point in the range of about 120° C. to about 130° C. combined with propylene copolymers.

In an alternative embodiment, the fabric is removed from the compression mold upon substantial solidification of the backing layer and placed in a tray having a shape and dimensions which are substantially the same as the compression mold. The face fabric is then heated to supplement relaxation of the stresses introduced by molding, and the backing layer is cooled, simultaneously with the heating of the face fabric, to maintain the backing layer in a substantially solid state.

The face fabric may comprise pigmented polypropylene fibers and the backing layer may be selected from the group consisting of polyethylene and latex backed with polyethylene. This is a preferred composition when the molded fabric comprises an automobile interior component.

Still further, a process for molding textile fabrics and substantially preventing post molding fabric curl and distortion is disclosed, comprising compression molding a fabric comprising a face fabric and backing layer in a compression mold with at least the backing layer at an elevated temperature greater than a melting temperature of the backing layer; cooling the fabric while still in the compression mold, at least until the backing layer solidifies; removing the fabric from the compression mold upon substantial solidification of the backing layer; placing the fabric in a tray having a shape and dimensions which are substantially the same as the compression mold; heating the face fabric to relax the stresses introduced by molding; and cooling the backing layer, simultaneously with the heating of the face fabric, to maintain the backing layer in a substantially solid state. When a substantially solid state of the backing has been reached, fabric is then trimmed to predetermined specifications.

Preferably, the process of the present invention includes preheating the backing layer to a temperature that is greater than or equal to a melting temperature of the backing layer, but less than a melting temperature of the face fabric. Once the backing layer has melted or substantially softened, the fabric is then positioned over a female portion of the compression mold. A male portion of the compression mold is then mated with the female portion, thereby compressing the fabric therebetween.

Next, the face fabric is heated, via a heated portion of the mold which interfaces with the face fabric, to a preferred temperature between about 60° C. and 130° C., more preferably between about 80° C. and 120° C., and most preferably between about 90° C. and 100° C. Concurrently, the backing layer is cooled, via a cooled portion of the mold which interfaces with the backing layer, and maintained at a temperature below about 60° C. during the heating of the face fabric.

The heating of the face fabric and the cooling of the backing layer are conducted for a time period in the preferred range of about 20 to 180 seconds, more preferably for about 60 to 120 seconds, and most preferably for about 60 to 90 seconds.

BRIEF DESCRIPTION OF THE DRAWINGS

The present invention is further explained in the description which follows with reference to the drawings, illustrating, by way of non-limiting examples, various embodiments of the invention, with like reference numerals representing similar parts throughout the several views, and wherein.

DESCRIPTION OF THE PREFERRED EMBODIMENTS

The present invention is directed to modifications in the molding hardware and process to improve dimensional stability and minimize fabric curl distortion in compression molded fabrics. Fabric constructions suitable for use in the molding process according to the present invention include non-woven fabrics (preferably needlepunched), tufted fabrics, knitted fabrics and woven fabrics. The face fabrics may be made from polyolefins such as polypropylenes, polyesters, nylons, and/or thermoplastics having a lower melting point than polypropylene and propylene copolymers. Polypropylenes, and mixtures thereof with thermoplastics having a lower melting point than polypropylene are preferred. Examples of thermoplastics having a lower melting point than polypropylene are the REGALREZ family of resins that include hydrogenated styrenic based polymers with softening points ranging from about 85° C. to 140° C. The resins having softening points ranging between about 120° C. to 130° C. are preferred.

A stable shape is imparted to textile fabrics (nonwoven, tufted, knitted and woven) by coating them with a moldable backing. The moldable backing is substantially rigid in its solid state, which it is in throughout the range of temperatures for its practical use. Moreover, the moldable backing has a lower melting point than the face fabric (nonwoven, tufted, knitted and woven) to which it is coated.

Backcoatings suitable for molded shape retention include moldable latexes (e.g., ethylene vinyl acetate, styrene butyl rubber, acrylic), polyethylenes (e.g., extruded films), polypropylene copolymers and thermoplastics of a lower melting point than polypropylene, and moldable polyurethanes. The preferred backcoating materials are polyethylenes or polyethylenes and a latex binder layer for binding the face fabric with the backing layer.

The backing layer (i.e., moldable backing) is exposed to radiant heating, such as infrared heating, electrical heating, or other known types of radiant heat in a preheating process prior to placing the fabric in a mold, until the backing layer has softened or melted. The preheating is preferably carried out through exposure to infrared heaters contained in an oven, which may be manually controlled or automated (e.g., through use of automatic timed cycles and/or automated temperature control). However, other sources of heat such as electrical or other known radiant heat devices may be alternatively used. For example, infrared heaters are heated to a temperature in the range of about 300° C. to about 500° C., preferably about 330° C. to about 450° C., and most preferably from about 360° C. to about 400° C. to heat the backing layer to a preferred temperature of about 150° C. to about 160° C., as measured by thermocouples on the backing layer.

The fabric is preheated to a temperature which is above the melting point of the backing material but below the melting point of the face fabric. For example, when the backing layer is formed of polyethylene and the face fabric is polypropylene, the fabric is heated to a temperature greater than or equal to about 125° C. (i.e., the melting point of the polyethylene backing) but less than about 165° C. (i.e., the melting point of the polypropylene face fabric). The face fabric generally stays about 20° C. to 40° C. cooler than the backing during the preheating stage. The preheat step can take from about 30 to about 120 seconds. Preferably, the shortest acceptable time cycle to soften/melt the backing is used for production purposes, to maximize efficiency.

After preheating, the fabric is held in a clip or pin frame 7 for automated processes (see FIGS. 1 and 2), or is placed by hand on a pin frame of the specified size in preparation for molding. The frame is then precisely positioned over a female portion 4 of a compression mold.

Figure 1:
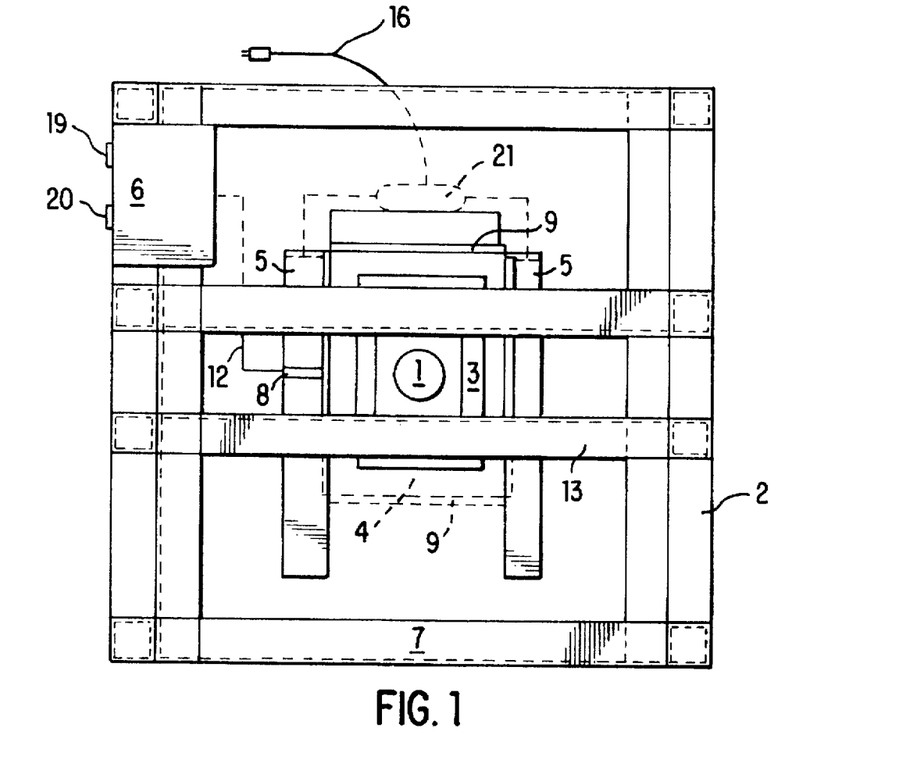
FIG. 1 is a top view of a diagram of a mold apparatus and supporting hardware used in the present invention.

In FIG. 1, the pin frame 7 is shown in phantom lines, in position for supporting a fabric above female mold portion 4 and beneath male mold portion 3. A supporting frame 2 is preferably made of stainless steel or other equivalent rigid material for supporting the pin frame 7 via brackets 15 and for supporting air cylinder mounting plate 13. Brackets 18 guide the pin frame and help maintain the pin frame in its proper position to ensure that it does not become misaligned during the process. Air cylinder 1 is securely fastened to (preferably by threaded engagement means, or other equivalent fixing means) and supported by air cylinder mounting plate 13. Air cylinder 1 is preferably a Bimba Model 7015—DXP Air Cylinder. However other equivalent and available air cylinders may be interchangeably used.

A flow controller 11, also preferably supplied by Bimba is interconnected to the air cylinder 1, via tubing for regulating the supply of compressed air to the cylinder to actuate the same. Tubing 12 is preferably ¼" plastic tubing, but other known equivalents may be interchangeably used. A disc valve 10, also preferably supplied by Bimba, is actuated to allow or prevent the flow of the compressed air to the flow controller 11, and is opened and closed to effect the same.

The male portion of the mold 3 is securely fastened to (preferably by threaded engagement means 14, but other equivalent secure fixation means may be interchangeably used) and supported by the air cylinder 1 for actuation thereby. Of course, the invention may also be arranged so that the female portion of the mold is actuated by the air cylinder.

Figure 2:
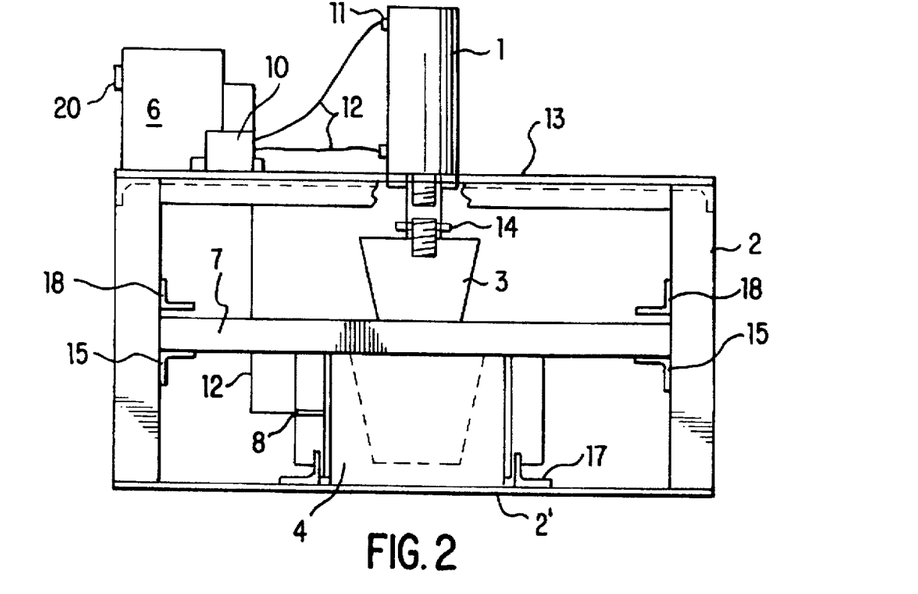
FIG. 2 is a front view diagram of the apparatus and supporting hardware shown in FIG. 1.

In the embodiment shown in FIGS. 1 and 2, strip plate heaters 5 are fixed (by screws, adhesives or other known fixing means) to the exterior sides of the female mold portion for actively heating the female portion of the mold during (and optionally, after) the molding process. In this example, there are preferably two strip plate heaters 5 and they are preferably supplied by Watlow from Batavia, Ill. Of course, other numbers of strip heaters may be used and equivalent strip heaters or other heating means may be interchangeably used in place of the Watlow strip heaters. Alternatively, the female mold may be provided with channels through which a heated liquid or gas medium may be passed to actively heat the female portion of the mold.

Figures 3A, 3B:
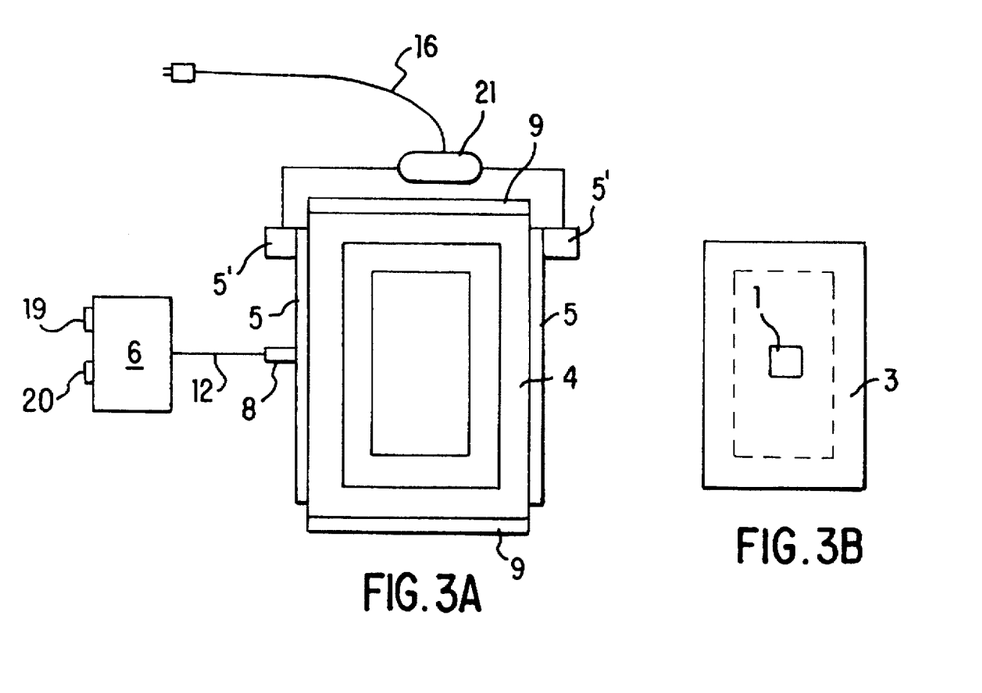
FIG. 3A is a top view of a diagram of a female mold portion of a mold apparatus used in the present invention.
FIG. 3B is a top view of a diagram of a male mold portion of a mold apparatus used in the present invention.

As shown in FIG. 3A, the strip heaters 5 are provided with at least one temperature probe which is electrically connected to temperature control panel 6, which maintains the temperature of the strip heaters within a preselected temperature range. Temperature control panel 6 is also preferably supplied by Watlow. Temperature control panel 6 includes an ON/OFF button 19 for powering up and powering down the temperature control panel and temperature control apparatus. The temperature control panel 6 further includes a display panel 20 (preferably an LED display, however an LCD display or other known equivalent display means could be used interchangeably) for displaying the "setting temperature" (i.e., the desired or target temperature) and for displaying the actual temperature.

A power supply cord 16 interconnects the strip heaters 5, via electrical joint box 21 and electrical connection boxes 5', and applies power to generate heat within the same, upon control thereof by the temperature control panel 6. Insulation plates 9 are provided over the front and back sides outside of the female mold portion to assist the strip heaters in maintenance of the desired temperature range of the female mold portion during (and optionally after) molding. In FIG. 2, the female mold portion is supported on the base 2' of the supporting frame 2, and is fit between supporting brackets 17 to ensure proper alignment of the female mold portion with the male mold portion during the molding process.

FIG. 3A shows a top view of the female mold portion 4 and attached temperature control apparatus. The power supply cord 16 connects with the strip heaters 5 at 5'. The power supply is preferably 110 V AC, but 220 V AC or a DC supply source may also be used. FIG. 3B shows a top view of the male portion of the mold with the air cylinder attached. The phantom line indicates the boundary of the lower surface of the male portion of the mold.

Figures 4A, 4B:
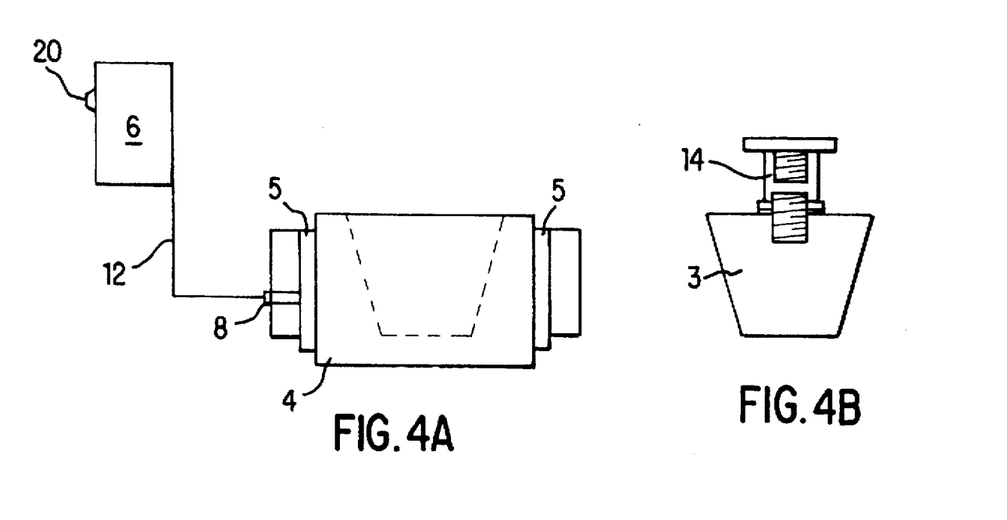
FIG. 4A is a front view diagram of the female mold portion shown in FIG. 3A.
FIG. 4B is a front view diagram of the male mold portion shown in FIG. 3B.

FIG. 4A shows a front view of the female mold portion 4 and attached temperature control apparatus shown in FIG. 3A. The inner surfaces of the female mold are shown in phantom lines. FIG. 4B shows a front view of the male mold portion 3 and the attachment 14 for connecting the male mold portion 3 to the air cylinder 1.

After preheating, to begin the compression molding phase of the process, male portion 3 of the compression mold, having interfitting dimensions with the female portion 4, is mated with the female portion 4, thereby compressing the fabric between the male and female portions.

The male and female portions of the compression mold may be fabricated from aluminum or other metals having good thermal conductivity. Alternatively, the mold portions may be constructed from fiberglass composites or other plastic composites capable of withstanding the temperatures and pressures exhibited during compression molding without distortion. An advantage of using composites is that they are readily adapted to fabrication into complex shapes with close tolerances.

In the present invention, as noted above, the mold portions may be modified to include heaters 5 in the mold portion (preferably the female mold portion 4) which is designed to interface with the face fabric, and optionally, to include coolers (not shown) in the mold portion (preferably the male mold portion 3) which is designed to interface with the backing. As noted above, the heaters preferably comprise electrical resistors, such as thin coat strip heaters (e.g. rated at 240 V and 1250 watts) embedded in the walls or (preferably) coated, adhered or affixed on the wall surfaces of the mold portion to be heated. At least one thermocouple (e.g., temperature probe 8) is provided to monitor the temperature of the heaters, which are controlled by a thermostatic temperature controller and power switching device (e.g., temperature control panel 6). Alternatively, the heaters may comprise pipes built into the wall of the mold portion to circulate hot water and/or steam or other hot liquids and/or gases. During the compression molding stage, the heaters are activated to supply heat to the face fabric. Since the molding portion has good thermal conductivity, heat is conducted from the heaters through the walls of the mold portion or directly transferred to the face fabric so as to heat the face fabric to the desired temperature range.

The heaters increase and maintain the face fabric within a preferred range of about 60° C. to about 130° C., more preferably in the range of 80° C. to about 120° C., while the backing layer cools to a solidification temperature. When the face fabric comprises polypropylene the most preferred temperature range is maintained at about 90° C. to 100° C. When the backing comprises polyethylene, the backing is preferably cooled to about 35° C. to 50° C. Typical molding time cycles preferably range from about 20 to about 180 seconds, more preferably from about 60 seconds to about 120 seconds, and most preferably from about 60 seconds to about 90 seconds.

The coolers in the mold portion which is designed to interface with the backing layer may comprise pipes built into the wall of the mold portion to circulate chilled water or some other chilled liquid. Since the molding portion has good thermal conductivity, heat is conducted from the backing layer to the piped chilled substance through the walls of the mold portion, thereby cooling the backing layer to shorten the time it takes to solidify the backing layer.

The maintenance of the face fabric within the temperature ranges described, allows stress relaxation of the face fabric material during the cooling process of the backing layer. Ordinarily, when the face fabric is allowed to cool along with the backing, stress concentrations build up in the face fabric and cause the unacceptable curling effect, as well as other dimensional distortions.

When the backing has been cooled to about 35° C. to 50° C., it achieves sufficient solidity and rigidity to hold the desired shape imparted to it by the mold. The molded fabric is then removed from the mold and placed on a trim tray having the same shape and dimensions as the mold. The molded fabric is then trimmed to the desired specifications, using water knives, or by manually cutting, for example. The fabric is removed from the trim tray, measured against specifications and stored for shipment.

Optionally, heaters of the type described above may also be provided in the walls of the trim tray which interface with the face fabric when the molded fabric is placed on the trim tray. In this way, the face fabric is further heated during the trim process, as a post molding step, to further facilitate stress relaxation in the face fabric. During the trim stage, the face fabric is heated to a temperature in the preferred range of about 60° C. to about 130° C., more preferably in the range of about 80° C. to about 120° C., most preferably within the range of about 90° C. to about 100° C. The backing maintains a temperature below about 60° C. during the heating of the face fabric. Alternatively, the face fabric may be heated by placing the molded fabric and trim tray in a circulating hot air oven.

The fabric is treated in the post-molding step for a time period preferably ranging from about 20 seconds to about 180 seconds, more preferably for about 60 seconds to about 120 seconds, most preferably for about 60 seconds to about 90 seconds. The modified trim tray and heating process can be used in conjunction with the heating/cooling compression molding, or instead of the heating/cooling compression molding process, in which case the known cold compression molding process would be substituted for the heating/cooling compression molding process. Table 1 shows the improved results which were obtained through the use of compression mold heating according to the present invention, post-mold heating (i.e., at the trim mold stage) without heating of the compression mold, and compression mold heating combined with post-mold heating. A control sample is also given in which the compression mold temperature was at room temperature and no post-mold heating was applied.

TABLE 1

| Sample No. | Denier | Polypropylene Fabric Type | Backing Materials | IR Heat & Seconds | Mold Temp | Post Mold Mold | Time Sec. | Curl Distortion | Curl[3] Rank |
| --- | --- | --- | --- | --- | --- | --- | --- | --- | --- |
| Control 1 | 17 | 15 oz Random Velour | Latex + PE | 360°/69 | RT | None | 60 + 0 | >90° | 5 |
| Control 2 | 17 | 15 oz Random Velour | Latex + PE | 360°/60 | RT | None | 60 + 0 | >60° | 4 |
| Control 3 | 17 | 14 oz Needled Loop | PE | 360°/67 | RT | None | 60 + 0 | >60° | 5 |
| Control 4 | 17 | 14 oz Needled Loop | PE | 360°/60 | RT | None | 95 + 0 | >45° | 4 |
| Control 5 | 17 | 14 oz Needled Loop | PE | 360°/67 | RT | None | 90 + 0 | >45° | 4 |
| Control 6 | 17 | 15 oz Needled Loop | PE | 360°/94 | RT | None | 90 + 0 | >30° | 3 |
| Control 7 | 17 | 15 oz Needled Loop | PE | 360°/60 | RT | None | 60 + 0 | >30° | 3 |

TABLE 1-continued

| Sample No. | Denier | Polypropylene Fabric Type | Backing Materials | IR Heat & Seconds | Mold Temp | Post Mold Mold | Time Sec. | Curl Distortion | Curl[3] Rank |
|---|---|---|---|---|---|---|---|---|---|
| Control 8 | 17 | 15 oz Needled Loop | PE | 360°/79 | RT | None | 60 + 0 | >45° | 4 |
| Control 9 | 17 | 15 oz Needled Loop | PE | 360°/82 | RT | None | 60 + 0 | >45° | 4 |
| Control 10 | 17 | 15 oz Random Velour | Latex + PE | 360°/77 | RT | None | 60 + 0 | >60° | 4 |
| Control 11 | 17 | 15 oz Random Velour | Latex + PE | 400° C./60 | RT | None | 60 + 0 | >90 | 5 |
| | 17 | 15 oz Random Velour | Latex + PE | 400° C./105 | RT | 95° C. | 60 + 180 | <20 | 2 |
| | 17 | 15 oz Random Velour | Latex + PE | 400° C./117 | RT | 95° C. | 60 + 180 | <20 | 2 |
| | 17 | 15 oz Random Velour | Latex + PE | 400° C./120 | RT | 90°C. | 60 + 75 | <40 | 3 |
| | 17 | 15 oz Random Velour | Latex + PE | 400° C./83 | RT | 90°C. | 60 + 180 | <20 | 2 |
| | 17 | 14 oz Needled Loop | PE | 400° C./90 | RT | 90°C. | 60 + 180 | Zero | 1 |
| | 17 | 14 oz Needled Loop | PE | 400° C./86 | RT | 90°C. | 60 + 180 | <20 | 2 |
| | 17 | 14 oz Needled Loop | PE | 400° C./94 | RT | 90°C. | 60 + 180 | <40 | 3 |
| | 17 | 14 oz Needled Loop | PE | 400° C./97 | RT | 90°C. | 60 + 180 | <20 | 2 |
| | 17 | 14 oz Needled Loop | PE | 400° C./84 | RT | 90° C. | 60 + 180 | Zero | 1 |
| | 17 | 15 oz Random Velour | Latex + PE | 400° C./60 | 75° C. | None | 60 + 0 | <40 | 3 |
| | 17 | 15 oz Random Velour | Latex + PE | 400° C./60 | 90° C. | None | 60 + 0 | <40 | 3 |
| | 17 | 15 oz Random Velour | Latex + PE | 400° C./45 | 90° C. | None | 60 + 0 | <20 | 2 |
| | 17 | 15 oz Random Velour | Latex + PE | 400° C./60 | 100° C. | None | 70 + 0 | <20 | 2 |
| | 17 | 14 oz Needled Loop | PE | 400° C./60 | 90° C. | None | 60 + 30* | <20 | 2 |
| | 17 | 14 oz Needled Loop | PE | 400° C./60 | 90° C. | None | 60 + 30* | <20 | 2 |

In table 1, the column heading "Denier" refers to the denier of the polypropylene fibers used in the face fabric of the particular sample. "IR Heat and Seconds" refers to the temperature of the IR source, and the length of time in seconds, which the IR heat at that temperature, was applied to the backing to achieve a preheating temperature of the backing within the range of 150° C. to 160° C., as measured by thermocouples. The samples used had dimensions of about 30" by 22". Under the column heading "Mold Temp", "RT" refers to room temperature, wherein the mold halves were not positively heated or cooled, but merely existed at room temperature prior to inserting the fabric for compression molding. The samples that were heated, were heated on the mold half which contacted the face fabric.

"Post Mold Heat" was applied by placing the sample in a circulating hot air oven. The column heading "Time Sec." includes the time that the sample is in the mold (i.e., the compression mold)+the time that the molded fabric is post mold heated in an oven (* —in Sample Nos. 14 and 15, the molded samples were not post mold heated in an oven, but were allowed to remain in the female portion of the mold, after the male portion of the mold was removed, for 30 seconds). For example, sample Control 1 was preheated for 69 seconds and compression molded for 60 seconds. In comparison, sample 14 was preheated for 60 seconds, compression molded for 60 seconds, and then the mold was opened, while the sample remained in the female half of the mold (with the face fabric contacting the female half) for 30 seconds.

"Curl Distortion Angle" is a visual estimate of fabric deformation that occurs when a cut is made on the molded fabric and the cut edge is allowed to deform over time. In the above samples, the fabrics were removed from the pin frames after molding (and post-molding treatment, if any). Pressure sensors, thermocouples and/or any other instrumentation on the samples were removed, and the samples were then measured and cut. The samples were allowed to deform for 24 hours after cutting, before the visual estimates were performed. The angle numbers given for curl distortion indicate the deviation of the cut edges from their original position at the time of cutting. With regard to "Curl Rank", 1 is best for purposes of this invention, and 5 is worst.

EXAMPLES

Comparative Example (see Control 1 Sample in Table 1)

A fabric having a polyethylene backing (polyethylene supplied by Dow Chemical Company, melt index=120), latex binding layer (a vinyl acetate polymer supplied by Parachem, i.e., Parachem VA-928) and a face fabric made from random velour polypropylene fibers (15 oz, 17 denier) was preheated in an infrared oven radiating a temperature of 360° C. for 69 seconds until the backing temperature was within the range of 150° C.–160° C. as measured with thermocouples. The dimensions of the fabric were about 30 inches long and 22 inches wide.

The fabric was pinned in the length direction only. The pinned fabric was precisely positioned over a female portion of a compression mold. A male portion of the compression mold, having interfitting dimensions with the female portion, was mated with the female portion, thereby compressing the fabric between the male and female portions. Both the female and male portions of the mold were at room temperature prior to mating the portions. The fabric was molded for approximately 60 seconds, after which the mold portions were separated and the molded fabric was removed from the mold.

The fabric was then cut and the open fabric was allowed to deform for approximately 24 hours. The curl distortion angle of the open fabric was observed to be greater than 90 degrees, as measured from the surface of the fabric to the curl edge.

Comparative Examples 2–11 (see Sample Control Nos. 2–11 in Table 1)

Comparative Examples 2–11 were carried out using the same techniques described in Comparative Example 1 above, but modified using the conditions, parameters and materials as set forth in Table 1 above.

Example 1 (see Sample No. 13 in Table 1)

A fabric having a polyethylene backing (polyethylene supplied by Dow Chemical Company, melt index=120), latex binding layer (a vinyl acetate polymer supplied by Parachem, i.e., Parachem VA-928), and a face fabric made from random velour polypropylene fibers (needlepunched with fibers supplied by Hercules, Incorporated 15 oz, 17 denier/filament staple) was preheated in an infrared oven radiating a temperature of 400° C. for 60 seconds until the backing temperature was within the range of 150° C.–160° C. as measured with thermocouples. The dimensions of the fabric were about 30 inches long and 22 inches wide.

The fabric was pinned in the length direction only. The pinned fabric was precisely positioned over a female portion of a compression mold. A male portion of the compression mold, had interfitting dimensions with the female portion. The female portion was modified by adding thin coat strip heaters (240 V, 1250 watts), thermocouples, a temperature controller and a power switching device. The female mold portion was heated to 100° C. as measured by the thermocouples and the male portion was mated therewith (the male portion was at room temperature), thereby compressing the fabric between the male and female portions. The fabric was molded for approximately 70 seconds, after which the mold portions were separated and the molded fabric was removed from the mold.

The fabric was then cut and the open fabric was allowed to deform for approximately 24 hours. The curl distortion angle of the open fabric was observed to be less than 20 degrees, as measured from the surface of the fabric to the curl edge.

Example 2 (see Sample No. 4 in Table 1)

A fabric having a polyethylene backing, (polyethylene supplied by Dow Chemical Company, melt index=120), latex binding layer (a vinyl acetate polymer supplied by Parachem, i.e., Parachem VA-928) and a face fabric made from random velour polypropylene fibers (needlepunched with fibers supplied by Hercules, Incorporated 15 oz, 17 denier/filament staple) was preheated in an infrared oven radiating a temperature of 400° C. for 83 seconds until the backing temperature was within the range of 150° C.–160° C. as measured with thermocouples. The dimensions of the fabric were about 30 inches long and 22 inches wide.

The fabric was pinned in the length direction only. The pinned fabric was precisely positioned over a female portion of a compression mold. A male portion of the compression mold had interfitting dimensions with the female portion. The female portion was not modified with thin coat strip heaters. The female mold portion was at room temperature and the male portion (also at room temperature) was mated therewith, thereby compressing the fabric between the male and female portions. The fabric was molded for approximately 60 seconds, after which the mold portions were separated and the molded fabric was removed from the mold.

The fabric was immediately placed in a hot air oven having an environment temperature of 90° C. for 180 seconds for post-mold heating.

The fabric was then cut and the open fabric was allowed to deform for approximately 24 hours. The curl distortion angle of the open fabric was observed to be less than 20 degrees, as measured from the surface of the fabric to the curl edge.

Example 3 (see Sample No. 14 in Table 1)

A fabric having a polyethylene backing (polyethylene supplied by Dow Chemical Company, melt index=120), and a face fabric made from needled loop polypropylene fibers (14 oz, 17 denier) was preheated in an infrared oven radiating a temperature of 400° C. for 60 seconds until the backing temperature was within the range of 150° C.–160° C. as measured with thermocouples. The dimensions of the fabric were about 30 inches long and 22 inches wide.

The fabric was pinned in the length direction only. The pinned fabric was precisely positioned over a female portion of a compression mold. A male portion of the compression mold, had interfitting dimensions with the female portion. The female portion was modified by adding thin coat strip heaters (240 V, 1250 watts), thermocouples, a temperature controller and a power switching device. The female mold portion was heated to 100° C. as measured by the thermocouples and the male portion was mated therewith (the male portion was at room temperature), thereby compressing the fabric between the male and female portions. The fabric was molded for approximately 60 seconds, after which the male mold portion was separated from the female mold portion.

The molded fabric was then allowed to remain in the female portion of the mold for 30 seconds while the remaining heat in the female portion of the mold effected post-mold heating.

The fabric was then cut and the open fabric was allowed to deform for approximately 24 hours. The curl distortion angle of the open fabric was observed to be less than 20 degrees, as measured from the surface of the fabric to the curl edge.

Dimensional stability testing of the fabrics molded according to the inventive techniques also showed improved results over fabrics which were molded by the conventional room temperature compression molding techniques. The method and device for stability testing disclosed in U.S. Pat. No. 4,750,374 were employed for dimensional stability testing in this case. U.S. Pat. No. 4,750,374 is hereby incorporated by reference in its entirety for disclosure of such method and device.

Dimensional change was measured in the machine along three axes like that shown in FIG. 1 of U.S. Pat. No. 4,750,374, with one axis or arm preferably being in the machine direction. A second arm or axis is arranged preferably at a diagonal direction which is about 45° with respect to the machine direction (i.e., axis in the machine direction), and a third axis or arm is placed at a cross direction which is preferably at about 90° with respect to the machine direction, and about 45° with respect to the diagonal direction.

The arranged fabric is then placed in an oven at room temperature; heated to a temperature of about 100° F. to about 200° F., preferably from about 120° F. to about 140° F., and even more preferably from about 127° F. to about 135° F.; and cooled back to room temperature. Preferably, the heating and cooling stages are performed at a rate of about 20° F. per minute. Upon achieving the intended temperature range during heating, the fabric is then preferably maintained within that heating range for preferably about two hours, but this time can be adjusted as required.

The preferred test temperatures are determined according to actual temperatures that the fabric may be exposed to. For example, the fabric may be subject to temperatures of 130° F. to 140° F. during storage, prior to installation, and thus must be able to stably withstand these temperatures without dimensional distortion.

The probes which are placed on the fabric during testing, record any dimensional changes in the fabric as the temperature increases to the target range, during the exposure period at the target range, and during cooling back to the room temperature. Test results are recorded as percent change from the original dimension. A negative value indicates shrinkage, whereas a positive value indicates expansion.

Dimensional changes during the tests are recorded by a carpet stability tester as disclosed in the above-mentioned patent. Table 2 discloses the results of some of the tests.

cooling the backing layer while the face fabric and the backing layer remain in the compression mold, at least until solidification of the backing layer; and heating the face fabric, while cooling the backing layer, to relax stresses introduced during the compression molding.

2. The process of claim 1, wherein the compression molding comprises:

preheating the backing layer to a temperature that is greater than or equal to a melting temperature of the backing layer, but less than a melting temperature of the face fabric;

positioning the fabric over a female portion of the compression mold; and mating a male portion of the compression mold with the female portion, thereby compressing the fabric between the male portion and the female portion.

3. The process of claim 1, further comprising:

removing the fabric from the compression mold upon the solidification of the backing layer.

4. The process of claim 3, further comprising:

placing the fabric in a tray having a shape and dimensions which are substantially the same as the compression mold; and

TABLE 2

| | | | | | | Dimensional Stability Test Maximum Change % Shrinkage (−); Growth (+) | | | |
|---|---|---|---|---|---|---|---|---|---|
| Sample Number | Fabric Type | Backing Materials | Mold Temp | Time Sec. | Tester Heat °F. | Machine Direction | Cross Direction | Diagonal Direction | Rank |
| Control 1 | Polyester Random Velour | Latex + PE | RT | 60 | 131 | −0.1 | −0.5 | −0.2 | 1 |
| Control 2 | Polypropylene Random Velour | Latex + PE | RT | 60 | 135 | −0.7 | −0.8 | −0.6 | 5 |
| | Polypropylene Random Velour | Latex + PE | 75° C. | 60 | 127 | −0.6 | −0.6 | −0.6 | 3 |
| | Poly-Propylene Random Velour | Latex + PE | 90° C. | 60 | 133 | −0.35 | −0.6 | −0.6 | 2 |

It was determined that severe stretch is applied to the fabric (up to about 40%) in the machine direction during molding. Applying heat to the face of the polypropylene fabric during molding reduces the dimensional change in the molded machine direction when heat is reapplied.

Although the invention has been described with reference to particular means, materials and embodiments, it is to be understood that the invention is not limited to the particulars disclosed and extends to all equivalents within the scope of the claims.

What is claimed is:

1. A process for molding textile fabrics and substantially preventing post molding fabric curl and distortion comprising:

compression molding a fabric comprising a face fabric and a backing layer in a compression mold with at least the backing layer at an elevated temperature greater than a melting temperature of the backing layer;

trimming the fabric to desired specifications.

5. The process of claim 1, wherein the compression mold comprises a mold surface which contacts the backing layer during the molding and is a cold mold having a temperature of room temperature or less than the room temperature.

6. The process of claim 1, wherein the heating of the face fabric comprises heating the face fabric to a temperature between about 60° C. and 130° C., and maintaining the temperature of the face fabric at least until the solidification of the backing layer.

7. The process of claim 6, wherein the heating of the face fabric comprises heating the face fabric to a temperature between about 80° C. and 120° C., and maintaining the temperature of the face fabric at least until the solidification of the backing layer.

8. The process of claim 7, wherein the heating of the face fabric comprises heating the face fabric to a temperature between about 90° C. and 100° C., and maintaining the temperature of the face fabric at least until the solidification of the backing layer.

9. The process of claim 1, wherein the heating of the face fabric comprises heating the face fabric to a temperature and maintaining the temperature of the face fabric for about 20 to 180 seconds.

10. The process of claim 9, wherein the heating of the face fabric comprises heating the face fabric to a temperature and maintaining the temperature of the face fabric for about 60 to 120 seconds.

11. The process of claim 10, wherein the heating of the face fabric comprises heating the face fabric to a temperature and maintaining the temperature of the face fabric for about 60 to 90 seconds.

12. The process of claim 1, wherein the cooling of the backing layer while the face fabric and the backing layer remain in the compression mold, at least until the solidification of the backing layer, comprises cooling the backing layer to a temperature within the range of about 35° C. to 50° C.

13. The process of claim 1, wherein the face fabric is selected from the group consisting of non-woven fabrics, tufted fabrics, knit fabrics and woven fabrics; and wherein the backing layer is selected from the group consisting of moldable latexes, moldable polyurethanes, polyethylene, polypropylene copolymers, thermoplastics having a lower melting point than polypropylene, a latex binder backed with polyethylene, a latex binder backed with at least one moldable polyurethane, a latex binder backed with at least one polypropylene copolymer, and a latex binder backed with at least one thermoplastic having a lower melting point than polypropylene.

14. The process of claim 13, wherein materials used for the face fabric comprise polyolefins.

15. The process of claim 14, wherein the polyolefins are selected from the group consisting of isotactic polypropylenes, mixtures of propylenes with polyethylenes, and resins having a melting point in the range of about 120° C. and 130° C. combined with propylene copolymers.

16. The process of claim 1, further comprising:

removing the fabric from the compression mold upon the solidification of the backing layer; and heating the face fabric to supplement relaxation of stresses introduced by the molding.

17. A process for molding textile fabrics and substantially preventing post molding fabric curl and distortion comprising:

compression molding a fabric comprising a face fabric and a backing layer in a compression mold with at least the backing layer at an elevated temperature greater than a melting temperature of the backing layer;

cooling the fabric while the fabric remains in the compression mold, at least until substantial solidification of the backing layer;

removing the fabric from the compression mold upon the substantial solidification of the backing layer;

placing the fabric in a tray having a shape and dimensions which are substantially the same as the compression mold;

heating the face fabric to relax stresses introduced by the molding; and cooling the backing layer, simultaneously with the heating of the face fabric, to maintain the substantial solidification of the backing layer.

18. The process of claim 17, further comprising:

trimming the fabric.

19. The process of claim 17, wherein the compression molding comprises:

preheating the backing layer to a temperature that is greater than or equal to a melting temperature of the backing layer, but less than a melting temperature of the face fabric;

positioning the fabric over a female portion of the compression mold; and mating a male portion of the compression mold with the female portion, thereby compressing the fabric.

20. The process of claim 17, wherein the heating of the face fabric comprises heating the face fabric to a temperature between about 60° C. and 130° C.; and wherein the cooling the of backing layer comprises maintaining the backing layer at a temperature below about 60° C. during the heating of the face fabric.

21. The process of claim 20, wherein the heating of the face fabric comprises heating the face fabric to a temperature between about 80° C. and 120° C.

22. The process of claim 21, wherein the heating of the face fabric comprises heating the face fabric to a temperature between about 90° C. and 100° C.

23. The process of claim 17, wherein the heating of the face fabric and the cooling of the backing layer are conducted for a time period in the range of about 20 to 180 seconds.

24. The process of claim 23, wherein the heating of the face fabric and the cooling of the backing layer are conducted for a time period in the range of about 60 to 120 seconds.

25. The process of claim 24, wherein the heating of the face fabric and the cooling of the backing layer are conducted for a time period in the range of about 60 to 90 seconds.

26. The process of claim 16, comprising the cooling of the backing layer of the fabric, simultaneously with the heating of the face fabric, to maintain the backing layer in a substantially solid state.

27. The process of claim 16, further comprising:

placing the fabric in a tray having a shape and dimensions which are substantially the same as the compression mold, during the heating of the face fabric to supplement relaxation of stresses introduced by the molding.

28. The process of claim 26, further comprising:

placing the fabric in a tray having a shape and dimensions which are substantially the same as the compression mold, during the heating of the face fabric to supplement relaxation of stresses introduced by the molding.

* * * * *